United States Patent Office 2,892,872
Patented June 30, 1959

2,892,872
CHLORINATED BENZOPHENONE ULTRAVIOLET ABSORBERS

Warren S. Forster, Basking Ridge, N.J., assignor to American Cyanamid Company, New York, N.Y., a corporation of Maine No Drawing. Application October 9, 1957
Serial No. 689,054

5 Claims. (Cl. 260—591)

This invention relates to new ultraviolet absorbers, and more specifically, it relates to new ultraviolet absorbers having the structure:

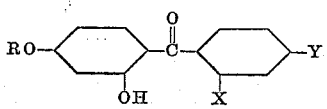

in which R is a lower alkyl group and X and Y may be hydrogen or chlorine, at least one being chlorine.

The plastics industry has long been faced with a serious problem in the deterioration of light colored plastics upon exposure to light. Transparent or light colored plastics upon long exposure to light undergo deterioration with resultant darkening. Recently, there have been developed a number of classes of compounds which are grouped together under the title of "ultraviolet absorbers." These are designed to be incorporated in various plastics in order to prevent ultraviolet light from causing this deterioration.

With certain plastics, specific problems arise which require special properties in the ultraviolet absorbers. For example, polyvinyl chloride must be stabilized against both degradation by ultraviolet light and deterioration from heat. Since polyvinyl chloride is given various degrees of heat treatment during the manufacture of articles, heat stabilization is of the utmost importance during the stage of its existence. However, since polyvinyl chloride is usually a light colored or even a translucent material, it must also be stabilized against the deterioration by ultraviolet light during its lifetime.

A problem with commercially available ultraviolet absorbers is color. To be a good ultraviolet absorber, the compound must absorb rather broadly in the near ultraviolet, and yet, must have a minimum absorption in the visible range. In practice, a compromise is usually obtained by having an ultra-violet absorber which so slightly overlaps the visible range that its color is a very pale yellow. When compounds are obtained which have no visible color, it is usually found that the absorption peak in the ultraviolet has shifted so far away from the visible as to be beyond the range wherein the most effective ultraviolet protection is obtainable.

I have found that a specific class of benzophenones has absorption in the ultraviolet at approximately the correct wave length and still possesses practically no visible color, and furthermore, gives improved protection to polyvinyl chloride with or without heat stabilization. The new ultraviolet absorbers of my invention are para-alkoxy-ortho-hydroxy-benzophenones having either an ortho or a para-chloro substituent or both ortho and para chloro substituents. These compounds are peculiarly effective as ultraviolet absorbers in a great many transparent-translucent and light colored plastics.

It is an advantage of the compounds of my invention that they combine good protection from ultraviolet light with freedom from visible color and are greatly superior to compounds of the prior art. It is a further advantage of my invention that the compounds are less volatile than those of the prior art and consequently show less tendency to be lost in this manner from the incorporating material during heat treatment than the unchlorinated ultraviolet absorber.

The compounds of my invention are prepared by the condensation of para-chlorobenzoyl chloride or ortho-para-dichlorobenzoyl chloride with a meta-dialkoxy benzene in reactions known to the art. The reaction is carried out usually in the presence of aluminum chloride or other Friedel-Crafts catalysts and the ortho-alkoxy group is dealkylated either by heating with aluminum chloride or by a separate dealkylation step, such as the passing of a hydrogen halide through the reaction mixture containing the Friedel-Crafts catalyst. The reaction is carried out usually in a solvent which is inert to Friedel-Crafts catalyst.

The compounds of my invention are especially useful in the protection of plastics which are either transparent, translucent or light in color. Especially of interest are such plastics as polyvinylchloride, polyesters, such as the alkyds and the modified alkyd resins, thermoplastic synthetic fibers, such as nylon and the like, polyalkenes, such as polyethylene, polypropylene, polystyrene, and the like, and as a protective element in the plastic layer in safety glass, protecting the material behind the safety glass from deterioration by light as well as the plastic layer against deterioration or discoloration. In a similar manner, they are also useful in various transparent wrapping materials, such as cellophane and other plastic materials even when the plastic itself is not subject to deterioration by light in order to protect material packaged beneath the wrapping material.

This application is a continuation-in-part of my copending application together with Mario Scalera and William B. Hardy, Serial No. 522,831, filed July 18, 1955, now abandoned.

My invention can be illustrated by the following examples in which parts are by weight unless otherwise indicated. The examples are intended to illustrate and not to limit the invention.

Example 1

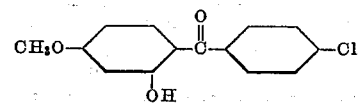

A mixture of 87.5 parts of para-chlorobenzoyl chloride, 640 parts of tetrachloroethane, and 97.3 parts of 1,3-dimethoxybenzene (resorcinol dimethyl ether) is cooled while 77.6 parts of aluminum chloride is gradually added. The mixture is then stirred at room temperature until thorough mixing has been achieved. The temperature is then slowly raised to 90° C., at which temperature the mixture is held until the reaction is substantially complete. The mixture is cooled and 500 parts of 6 N hydrochloric acid is added slowly. The mixture is stirred a short time at 50° C., to break up lumps and is then recooled. The oil layer is separated, washed with diluted hydrochloric acid, followed by water, dilute aqueous ammonia and then again water. The solvent (tetrachloroethane) is removed by steam distillation. The residual yellow solid is filtered from the water and slurried twice in 1000 parts of 2.5% sodium bicarbonate solution, each time filtering off the solid. The latter is finally dissolved in hot dilute caustic soda, filtered hot and the filtrate is acidified with concentrated hydrochloric acid. The precipitated product is isolated by filtration, washed and dried.

Example 2

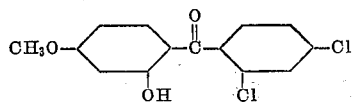

A mixture of 105 parts of 2,4-dichlorobenzoyl chloride, 640 parts of tetrachloroethane and 97 parts of resorcinol dimethyl ether is stirred and cooled while 77.6 parts of aluminum chloride is slowly added. The reaction mixture is then heated gradually with stirring to 89–93° C. Hydrogen chloride evolution begins before the reaction mixture has passed 50° C. The mixture is heated at 89–93° C., until the reaction is substantially complete and is then cooled to 10° C. with an ice bath. Five hundred parts of dilute hydrochloric acid is slowly added. The tetrachloroethane layer is separated, washed with dilute hydrochloric acid and water followed by ammonium hydroxide until free of acetic material. The solvent is then removed by steam distillation. The solvent is dissolved in hot ethanol and a small amount of activated charcoal is added. The mixture is filtered hot and the filtrate is allowed to cool. The product separates as an oil which is isolated and redissolved in hot alcohol, followed by another decolorization with charcoal. The product is then recrystallized several times from alcohol to give a product of the above structure.

Example 3

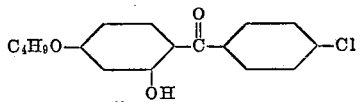

The procedure of Example 1 is followed using an equivalent amount of resorcinol dibutyl ether in place of the resorcinol dimethyl ether. The product has the above formula.

Example 4

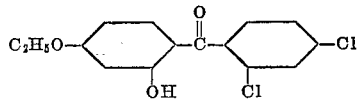

The procedure of Example 2 is followed using resorcinol diethyl ether instead of resorcinol dimethyl ether. The product has the above formula.

Example 5

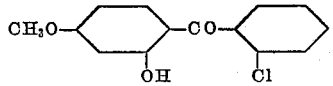

The procedure of Example 1 is followed using o-chlorobenzoylchloride in place of the para compound. The product obtained has the above formula.

Example 6

Polyvinyl chloride plasticized with 50 parts of di-2-ethylhexyl phthalate per 100 parts of resin is compounded with the specified ultraviolet absorbers at a concentration of 2% on the plasticized polyvinyl chloride and is made into a sheet. Plasticized polyvinyl chloride without an ultraviolet absorber is made into a sheet to use as a control. The ultraviolet absorbers used are the product of Example 1, and the commercially available related compound, 2-hydroxy-4-methoxybenzophenone. The three polyvinyl chloride sheets are exposed in a fadeometer until the sheets have darkened to a standard degree as measured by comparison with a standard piece of polyvinyl chloride. It is found that the control has darkened to the standard amount in 88 hours and the film containing the commercial unchlorinated benzophenone product has darkened in 154 hours. The film containing the product of Example 1 does not darken to the standard amount until 440 hours of exposure.

I claim:

1. Compounds of the formula:

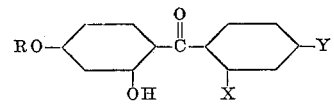

in which R is a lower alkyl group and X and Y are selected from the group consisting of hydrogen and chlorine, at least one being chlorine.

2. The compounds of claim 1 in which R is methyl.

3. The compound of the formula:

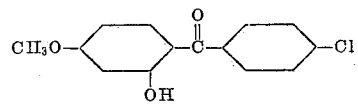

4. The compound of the formula:

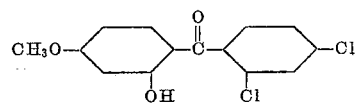

5. The compound of the formula:

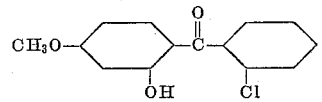

References Cited in the file of this patent

UNITED STATES PATENTS 2,777,828     Day et al. _____ Jan. 15, 1957

OTHER REFERENCES

Orito: Chem. Abstracts, vol. 24, p. 98 (1930).